(12) United States Patent
Velissarios et al.

(10) Patent No.: US 10,243,731 B2
(45) Date of Patent: Mar. 26, 2019

(54) HARDWARE BLOCKCHAIN ACCELERATION

(71) Applicant: Accenture Global Solutions Limited, Dublin (IE)

(72) Inventors: John Velissarios, London (GB); Callum Stuart Hyland, London (GB); Laurence Richard Freeman, London (GB); Piergiorgio Rettaroli, Rome (IT); Ennio Acernese, Rome (IT); Pasquale Di Tucci, Latina (IT); Salvatore Gifuni, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/832,729

(22) Filed: Dec. 5, 2017

(65) Prior Publication Data

US 2018/0219671 A1    Aug. 2, 2018

(30) Foreign Application Priority Data

Jan. 27, 2017    (EP) .................................... 17425005

(51) Int. Cl.
| | |
|---|---|
| H04L 9/06 | (2006.01) |
| H04L 29/06 | (2006.01) |
| G06F 21/72 | (2013.01) |
| H04L 9/08 | (2006.01) |
| H04L 9/14 | (2006.01) |
| H04L 9/30 | (2006.01) |
| H04L 9/32 | (2006.01) |

(Continued)

(52) U.S. Cl.
CPC ............ *H04L 9/0637* (2013.01); *G06F 21/10* (2013.01); *G06F 21/72* (2013.01); *H04L 9/0861* (2013.01); *H04L 9/14* (2013.01); *H04L 9/30* (2013.01); *H04L 9/3247* (2013.01); *H04L 9/3263* (2013.01); *H04L 63/04* (2013.01); *H04L 63/08* (2013.01); *H04L 63/0853* (2013.01); *H04W 12/10* (2013.01); *H04L 9/0877* (2013.01); *H04L 9/0897* (2013.01); *H04L 9/3234* (2013.01)

(58) Field of Classification Search
None
See application file for complete search history.

(56) References Cited

U.S. PATENT DOCUMENTS

| | | | |
|---|---|---|---|
| 7,369,657 B2 * | 5/2008 | Eldeeb .................... | G06F 21/72 380/28 |
| 7,644,266 B2 | 1/2010 | Ahuja et al. | |

(Continued)

OTHER PUBLICATIONS

Coleridge, Robert; The Cryptography API, or How to Keep a Secret; 1996; Retrieved from the Internet <URL: https://msdn.microsoft.com/en-us/library/ms867086.aspx>; pp. 1-13, as printed. (Year: 1996).*

(Continued)

*Primary Examiner* — Saleh Najjar
*Assistant Examiner* — Michael W Chao
(74) *Attorney, Agent, or Firm* — Brinks Gilson & Lione

(57) ABSTRACT

Hardware acceleration supports complex software processes. In particular, a hardware security module provides encryption support for transaction chains. In one implementation, the security module circuitry provides high-speed security features and acceleration of the security features for blockchain processing.

21 Claims, 9 Drawing Sheets

(51) Int. Cl.
*G06F 21/10* (2013.01)
*H04W 12/10* (2009.01)

(56) References Cited

U.S. PATENT DOCUMENTS

| | | | | |
|---|---|---|---|---|
| 8,694,781 | B1* | 4/2014 | Griffin | G06F 9/45558 |
| | | | | 713/168 |
| 8,892,868 | B1* | 11/2014 | Jenks | H04L 29/06 |
| | | | | 713/153 |
| 9,053,480 | B1* | 6/2015 | Jenks | G06Q 20/382 |
| 9,344,455 | B2* | 5/2016 | Himawan | H04L 63/20 |
| 10,043,029 | B2* | 8/2018 | Murray | G06F 21/3218 |
| 2004/0098600 | A1 | 5/2004 | Eldeeb | |
| 2004/0143762 | A1* | 7/2004 | Audebert | H04L 12/4633 |
| | | | | 726/9 |
| 2006/0017969 | A1* | 1/2006 | Ly | G06F 3/1204 |
| | | | | 358/1.15 |
| 2006/0161790 | A1* | 7/2006 | Hunter | G06F 21/575 |
| | | | | 713/189 |
| 2007/0011736 | A1 | 1/2007 | Kalibjian et al. | |
| 2008/0034199 | A1* | 2/2008 | Nair | G06F 21/602 |
| | | | | 713/153 |
| 2010/0156888 | A1* | 6/2010 | Luk | G06T 1/20 |
| | | | | 345/418 |
| 2011/0010720 | A1* | 1/2011 | Smith | G06F 21/00 |
| | | | | 718/102 |
| 2012/0005263 | A1* | 1/2012 | McWhirter | G06F 9/541 |
| | | | | 709/203 |
| 2012/0131354 | A1* | 5/2012 | French | G06F 21/602 |
| | | | | 713/189 |
| 2012/0284526 | A1* | 11/2012 | Arnold | G06F 21/31 |
| | | | | 713/182 |
| 2013/0010955 | A1 | 1/2013 | Lu et al. | |
| 2013/0067090 | A1* | 3/2013 | Batrouni | H04L 67/1097 |
| | | | | 709/226 |
| 2014/0282936 | A1* | 9/2014 | Fitzgerald | H04L 63/10 |
| | | | | 726/6 |
| 2015/0358161 | A1* | 12/2015 | Kancharla | H04L 63/0485 |
| | | | | 713/164 |
| 2015/0358294 | A1 | 12/2015 | Kancharla et al. | |
| 2015/0358313 | A1 | 12/2015 | Hussain et al. | |
| 2015/0381580 | A1* | 12/2015 | Graham, III | H04L 63/0428 |
| | | | | 713/168 |
| 2016/0077853 | A1 | 3/2016 | Feng et al. | |
| 2016/0125201 | A1* | 5/2016 | Villatel | G06F 9/46 |
| | | | | 726/30 |
| 2016/0182470 | A1* | 6/2016 | Rubin | H04L 63/06 |
| | | | | 713/168 |
| 2016/0260169 | A1* | 9/2016 | Arnold | G06Q 40/12 |
| 2016/0277373 | A1* | 9/2016 | Murray | H04L 63/061 |
| 2016/0292672 | A1* | 10/2016 | Fay | G06Q 20/363 |
| 2017/0237554 | A1* | 8/2017 | Jacobs | H04L 9/0819 |
| | | | | 713/171 |
| 2018/0060596 | A1* | 3/2018 | Hamel | G06F 21/62 |
| 2018/0300489 | A1* | 10/2018 | Roth | G06F 21/602 |

OTHER PUBLICATIONS

Cross et al.; Windows 2000 Server and PKI: Using the nCipher Hardware Security Module; 2001; Retrieved from the Internet <URL: https://technet.microsoft.com/en-us/library/dd277354.aspx>; pp. 1-17, as printed. (Year: 2001).*

No stated author; Microsoft Technet—Hardware Security Module (HSM); 2016; Retrieved from the Internet <URL: https://web.archive.org/web/20161107055745/https://social.technet.microsoft.com/wiki/contents/articles/10576.hardware-security-module-hsm.aspx>; pp. 1-1, as printed. (Year: 2016).*

Cachin, Christian; Architecture of the Hyperledger Blockchain Fabric; 2016; Retrieved from the Internet <URL: https://pdfs.semanticscholar.org/f852/c5f3fe649f8a17ded391df0796677a59927f.pdf>; pp. 1-4, as printed. (Year: 2016).*

Castro, M. et al., *"Practical Byzantine Fault Tolerance,"* Proceeddings of the Third Symposium on Operating Systems Design and Implementation, Feb. 1999, New Orleans, {castro,liskov}@lcs.mit.edu. (14p).

Deloitte—Bitcoin, Blckchain & Distributed Ledgers: Caught Between Promise and Reality, Centre for the Edge (Australia), (52p), Mar. 2016.

Government Office for Science—Distributed Ledger Technology: Beyond Block Chain—A Report by the UK Government Chief Scientific Advisor, Government Office for Science, London, England, 2016, www.gov.uk/go-science, (88p).

IBM 4767-002 PCIe Cryptographic Coprocessor (HSM), IBM 4767 Pcle HSM, Apr. 2016, www.ibm.com/security/cryptocards, (6p).

Symbiont Solution Brief, *"Securing Symbiont Smart Securities™ with SafeNet HSMs,"* Germalto Security to Be Free, Mar. 28, 2016, (2p).

Wang, Yongge, *"Public-Key Cryptography Standards: PKCS,"* University of North Carolina at Charlotte (arXiv 2012), (19p).

Australian Patent Office, Examination Report No. 1 for Australian Application No. 2017276160 dated May 11, 2018, pp. 1-6.

European Patent Office, Extended European Search Report in European Application No. 17208368.5 dated Jun. 14, 2018, pp. 1-8.

Australian Examination Report No. 2, dated Nov. 20, 2018, pp. 1-5, issued in Australian Patent Application No. 2017276160, Offices of IP Australia, Woden ACT, Australia.

* cited by examiner

HARDWARE BLOCKCHAIN ACCELERATION

CROSS REFERENCE

This application claims priority to European application number 17425005.0, filed 27 Jan. 2017, which is entirely incorporated by reference.

TECHNICAL FIELD

This disclosure relates to computer hardware acceleration of software processes. This disclosure also relates to hardware security support for software processes that support transaction chains, including blockchains.

BACKGROUND

Rapid advances in electronics and communication technologies, driven by immense customer demand, have resulted in newly emerging complex network transaction chains. Improvements in the hardware and software implementations of the underlying processing for the transaction chains will increase the security, features, and speed of the implementations.

DETAILED DESCRIPTION

Figure 1:
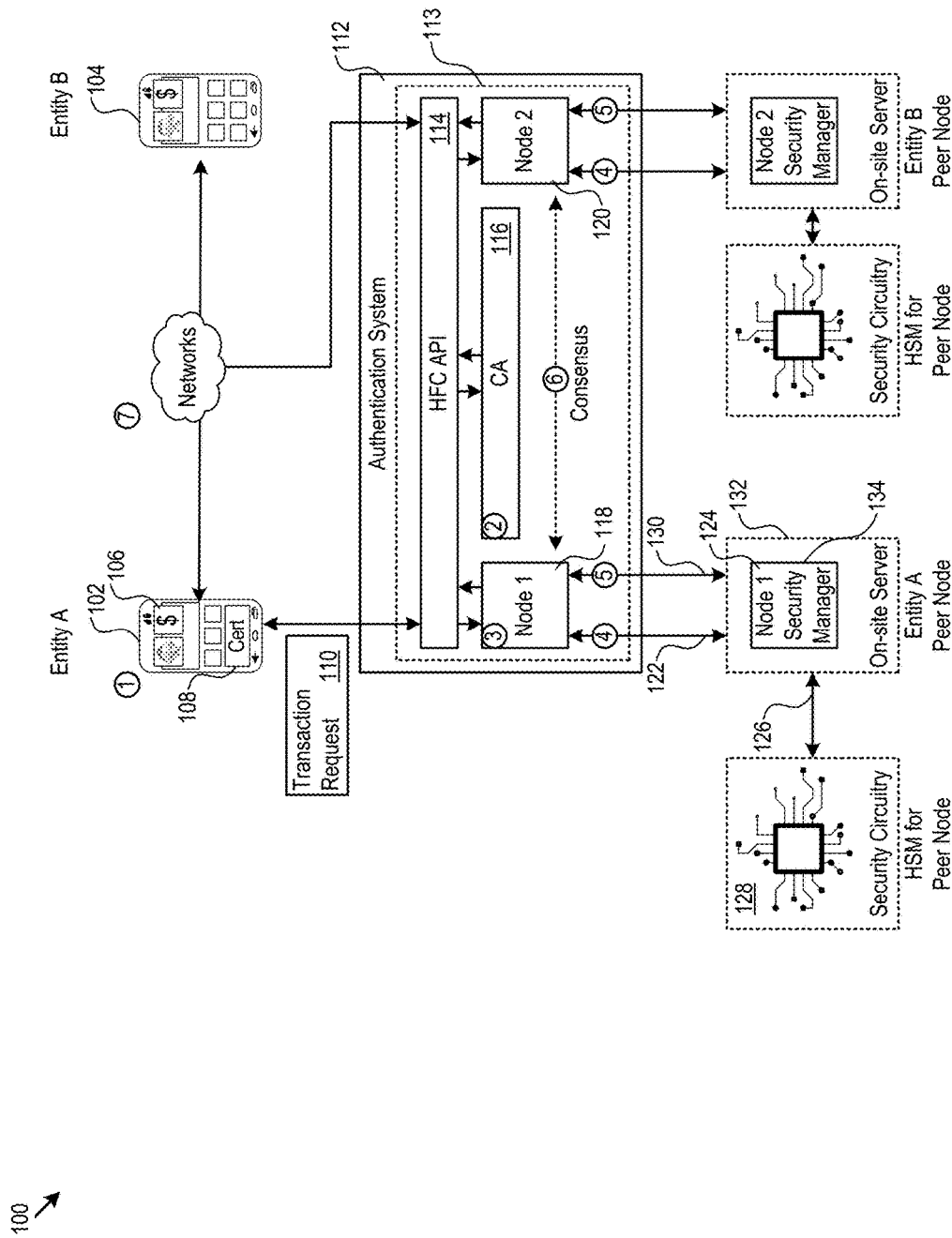
FIG. 1 shows a hardware accelerated transaction architecture.

FIG. 1 shows an example hardware accelerated transaction architecture 100 ("architecture" 100) that provides efficient and secure execution of complex transactions between entities. The entities may vary widely, and may be, as a few examples, hardware systems, software processes, or individuals. In FIG. 1, the smartphones 102 and 104 are shown as an example hardware platforms that permit entities to engage in transactions with support by the architecture 100. In this example, Entity A is associated with the smartphone 102 and Entity B is associated with the smartphone 104. In the example of FIG. 1, Entity A will engage in a digital exchange with Entity B. The digital exchange may be, e.g., a transfer of value between accounts held at different financial institutions. FIG. 1 provides one technological backdrop for a discussion of the technical solutions in hardware acceleration, but note that the hardware acceleration may be implemented in many other system contexts to support transactions of widely varying types.

In the example in FIG. 1, a smartphone application 106 accepts transaction input from Entity A that specifies a transaction amount and a transaction recipient: Entity B in this example. Smartphone 102 and 104 store an enrollment certificate 108 which the smartphone application 106 passes, e.g., in a transaction request 110, to an authentication system 112. The authentication system 112 may, as one example, implement a hyperledger fabric client (HFC) 113, e.g., in dedicated hardware or in a virtual machine or docker container for a virtual machine. An authentication interface 114 includes an exposed authentication application programming interface (API)) that receives the transaction request 110. The authentication system 112 may provide further layers of security, e.g., by requiring the transaction request 110 to travel over hypertext transfer protocol secure sockets (HTTPS), secured by transport layer security (TLS). (Logic flow (1) in FIG. 1.)

The enrolment certificate achieves authentication by encrypting the payload from the smartphone 102 with a public key associated with the enrolment certificate. The counterpart private key is securely held within the HFC certificate authority (CA) 116. The private key allows the authentication system 112 to verify the request. (Logic flow (2) in FIG. 1.)

A membership service running at a system node, e.g., the system node 118, may verify the account for Entity A that is specified in the transaction request 110. In addition, a transaction CA generates a unique transaction token. The transaction token uniquely identifies each transaction and is used to sign the request. The certificate allows the request to be passed into the validating peer node for Entity A 132 (e.g., an on-site server supporting operations for Entity A), where is it received at security controller circuitry 134. The security controller circuitry 134 responsively invokes the processing chaincodes. Chaincodes are the programmatic logic implemented to specifically support an implementation of the data storage layer, e.g., a blockchain shared ledger. In the example noted regarding transferring value, the chaincode is called to update the balances of two accounts in the shared global ledger. These accounts are stored in a serialized, encrypted format to provide separation of concerns for the systems. In other words, all of the accounts for the sender are encrypted with the sender's peer node (e.g., bank A) keys, and cannot be decrypted by the receiver's peer noted (e.g., bank B) keys, and vice versa. Accordingly, a request for encryption or decryption is sent to the relevant system hardware security module (HSM), e.g., the HSM 128 which supports the peer node for Entity A 132. (Logic flow (3) in FIG. 1.) Example HSMs include, but are not limited to, the nShield Solo™, nShield Edge™, and nShield Connect™ devices available from Thales e-Security.

In one implementation, the serialized, encrypted format is a Java script object notation (JSON) file, but other representations are also suitable. The format includes the account data (e.g., sender, recipient, quantity, timestamp, and other data) and a 'cipher' field. Upon encryption, the account data within the account is encrypted in the peer node HSM and the output is placed in the 'cipher' field. The peer node then resets selected fields within the account data, e.g., by setting pre-determined sensitive data fields to zero. The security controller circuitry 134 may employ symmetric cryptography, with all keys remaining securely in the HSMs. Each account includes a uniform resource locator (URL) field that specifies the URL for the security manager with which it was onboarded. Accordingly, any peer node may view the account and locate the API (via the URL field) to request encryption/decryption of an account.

In more detail, the chaincode sends a network request 122 to the security controller interface 124 which (preferably) has a hardware support interface 126 to the HSM 128. The interfaces 124 and 126 may include hardwired or wireless connections over proprietary or non-proprietary buses or communication networks, for instance. The network request 122 asks for the HSM 128 to decrypt a specific account so that the chaincode can alter the account balance. In support of obtaining the account to decrypt, the authentication system 112 abstracts the global world state stored in the blockchain by two exposed functions, putState( ) and getState( ). The authentication system 112 also mirrors a key/value store in the peer nodes, with the key/value store containing a list of the encrypted, serialized format account objects, linked by their unique identifier.

Expressed another way, the cryptographic functions are executed by a high security hardware device: the HSM 128, and are not limited to implementation in software. With the HSM 128, the implementation of the data storage layer no longer needs to directly perform encryption and decryption of data. As a result, the implementation show in FIG. 1 has increased security and scalability as compared to, for example, software only based security systems, and returns control to the enterprises that support the transactions. In some secure environments, the security controller circuitry 134 which controls the HSM 128 is physically housed with or near the HSM 128, e.g., in an enterprise secure data center. (Logic flow (4) in FIG. 1.)

Once the accounts for Entity A and Entity B are in decrypted format and following the balance updates in the respective accounts, the updated accounts are re-encrypted before being saved into the serialized encrypted data structure (e.g., the JSON file). To that end, the chaincode sends the encryption request 130 for the account to the security manager interface 124, which passes it to the HSM 128 for encryption. The encryption results return to the chaincode, and a new transaction is created within the bank's node, and the transaction is submitted/requested for inclusion in a new block in the blockchain. (Logic flow (5) in FIG. 1.)

Note that in this example implementation, both the Entity A account and the Entity B account are modified as a result of actions taken by the peer node which receives the transaction request. For instance, assume Bank A receives a request from their member Entity A to transfer value to Entity B associated with Bank B. Then, the Bank A peer node will request the authentication system 112 to identify update the accounts. In response, the authentication system 112 will call the security manager API (via the URL fields noted above) to request decryption for both accounts. The chaincode then modifies the balances of both accounts, and uses the same API previously identified to request encryption from the same HSMs. After modification and encryption, the chaincode requests submission of the updated accounts to the blockchain and consensus is run to ensure that all nodes share the same account state. Finally, update accounts are mirrored between all nodes.

Before the new block with the updated accounts can be added to the blockchain, every node in the system checks that its version of the world state is identical to ensure that there are no compromised nodes. After consensus is reached (e.g., all nodes have the same copy of the data structure), the new transaction is formally injected into the blockchain. The authentication system 112 may implement, for instance, the Practical Byzantine Fault Tolerance (PBFT) algorithm to provide increased speed and scalability to reach consensus in a private, permission blockchain system. (Logic flow (6) in FIG. 1.)

After consensus has been reached and the transaction is included in the blockchain, there is a polling mechanism which consistently checks for new blocks that have been added to the data structure. If a new transaction has been added to the ledger, a message is sent to the respective parties informing them of their account changes. In one implementation, Google Cloud Messaging (GCM) performs the notification to the smartphones 102 and 104. (Logic Point 7 in FIG. 1.)

Figure 2:
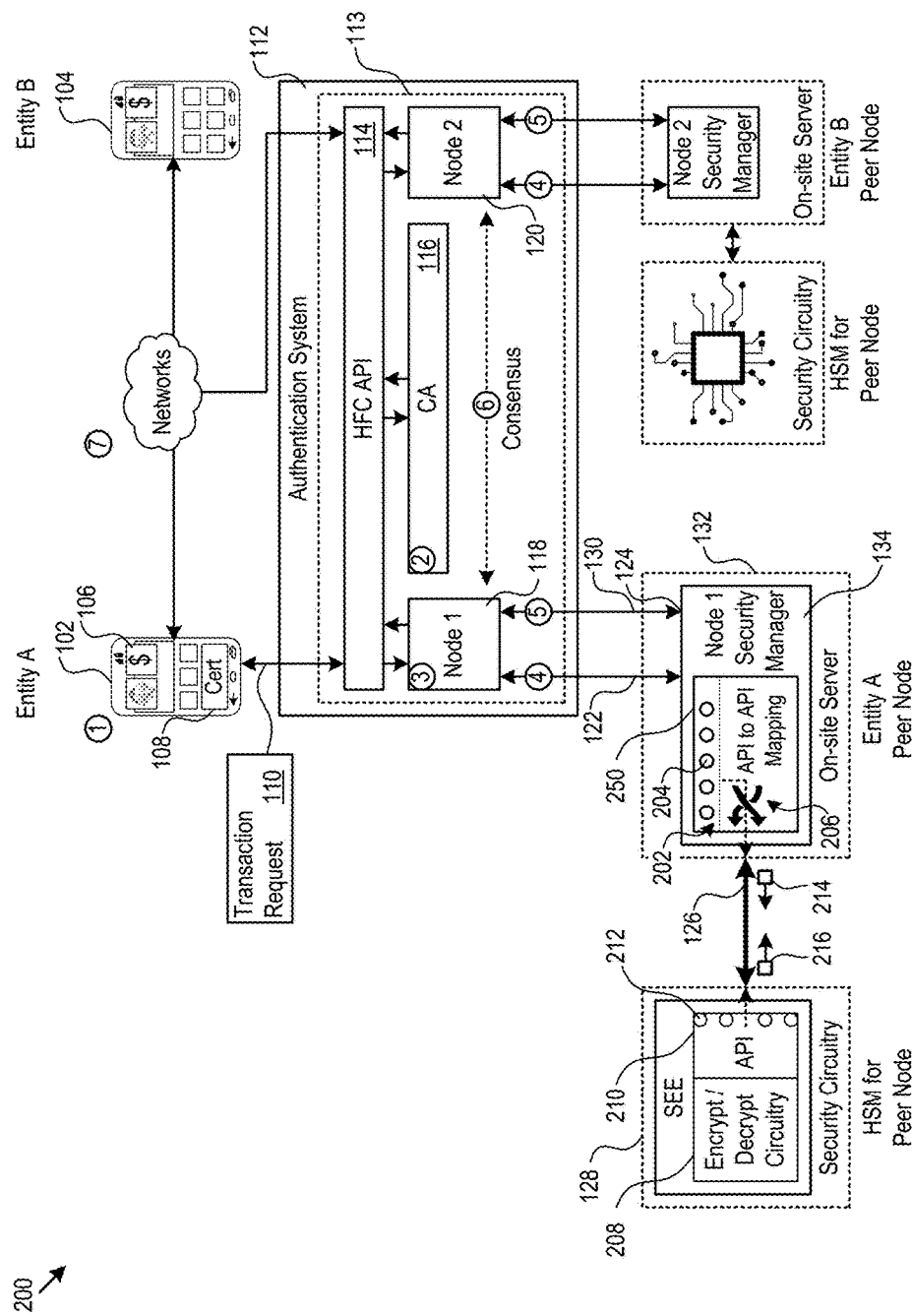
FIG. 2 illustrates an expanded view of the hardware accelerated transaction architecture.

FIG. 2 shows an expanded view 200 of the hardware accelerated transaction architecture. In FIG. 2, the Entity A peer node 132 includes the security controller circuitry 134. The security controller circuitry 134 defines an HSM interface 250 that includes a security manager API 202 and an API-to-API mapping 206. The security manager API 202 exposes a set of security manager functions, e.g., the security manager function 204 to request that the peer node 132 execute specified security functions (e.g., encrypt or decrypt data). The API-to-API mapping 206 implements, explicitly or implicitly, a security manager API to HSM API-to-API mapping tailored to the particular HSM in use, as described further below.

FIG. 2 also shows an example architecture 200 illustrating that the HSM 128 provides a secure execution environment (SEE) in which dedicated hardware security circuitry 208 performs encryption, decryption, key generation, key storage, key management, and other security functions. The HSM 128 defines an HSM API 210 that exposes a set of security functions, e.g., the HSM security function 212. The HSM security functions execute on the native HSM hardware to carry out the requested security functions 214 (e.g., decrypt data), and return security responses 216 (e.g., the decrypted data).

The API-to-API mapping 206 transforms incoming security requests received at the peer node 132 into an HSM specific function. The security controller circuitry 134 transmits the HSM specific functions to the HSM 128 in the form of the requested security functions 214. Similarly, the security controller circuitry 134 receives the security responses 216 from the HSM 128 after the HSM 128 executes the requested security function.

The HSM interface 250 provides a highly flexible and reconfiguration technical solution the problem of connecting a peer node to a wide range of possible HSMs. By reconfiguring the API-to-API mapping 206 to point to particular functions exposed in any given HSM, the peer node 132 may be efficiently adapted for use with a wide range of security hardware. Further, multiple instances of the HSM interface 250, each with different API-to-API mappings for different HSMs, may be implemented in any given peer node to simultaneously support multiple different HSMs, e.g., for redundant operation and fault tolerance.

Figure 3:
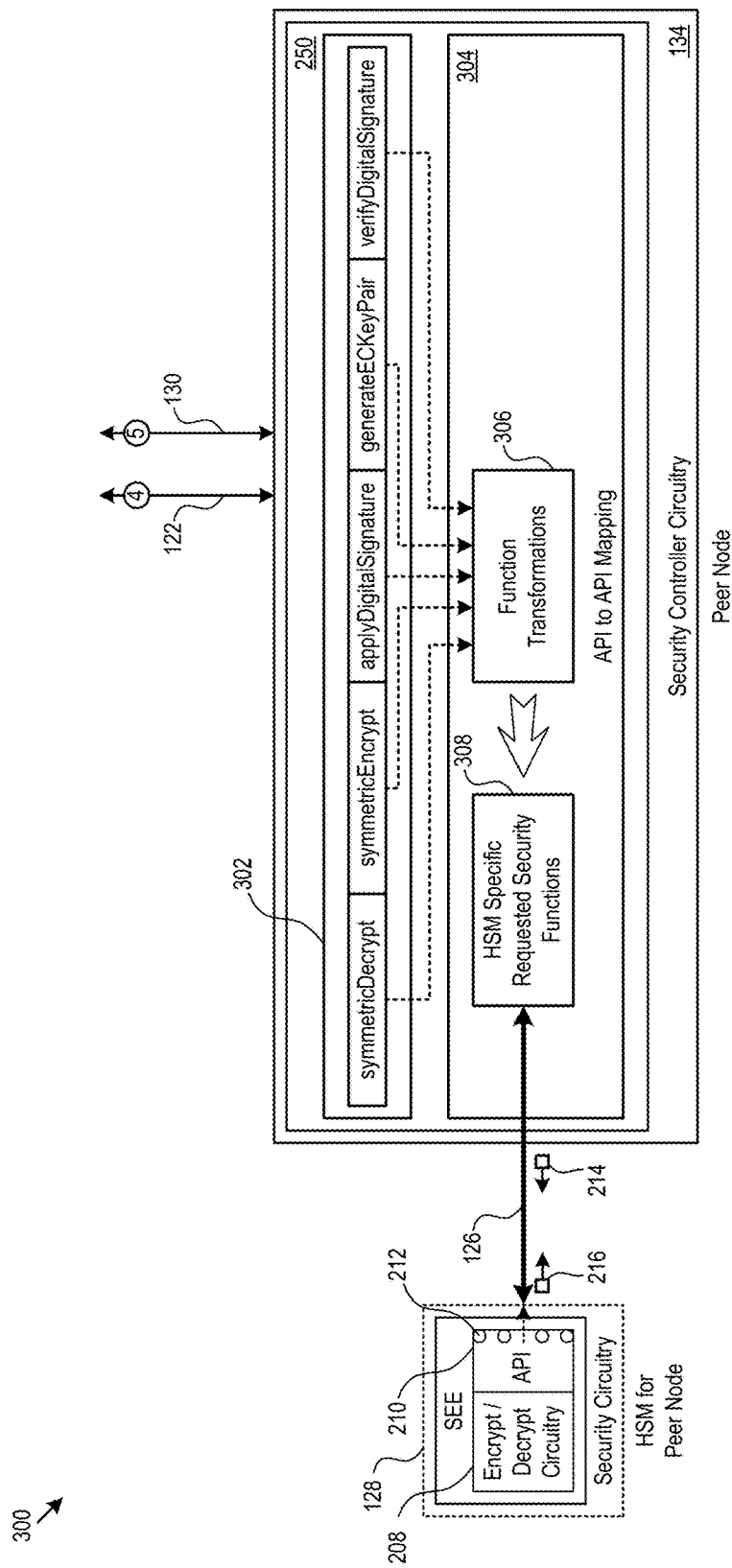
FIG. 3 shows an implementation example in which security manager circuitry exposes specific security manager functions as a security manager API.

FIG. 3 shows an implementation example 300 in which the security controller circuitry 134 exposes five specific security manager functions as the security manager API 302. Table 1, below, describes the security manager functions and indicates, in this one example, where mappings may be provided to specific HSMs or to software. That is, the security manager API 302, in concert with the API-to-API mapping 304, supports connection and messaging between multiple different HSMs. Note further that the API-to-API mapping 304 may provide redirection not only to HSM functions, but also to software implemented security functions, e.g., in cases where no HSM communicates with the peer node.

TABLE 1

| API Security Manager Function | Description | HSM Connection |
|---|---|---|
| symmetricEncrypt | Encrypt data with a symmetric key | Mapping to HSM 1<br>Mapping to HSM 2<br>Mapping to Software |
| symmetricDecrypt | Decrypt data with a symmetric key | Mapping to HSM 1<br>Mapping to HSM 2<br>Mapping to Software |
| applyDigitalSignature | Apply a Digital Signature to a message | Mapping to HSM 1 |
| verifyDigitalSignature | Verify the Digital Signature of a message | Mapping to HSM 1 |
| generateECKeyPair | Generate a key pair using the Elliptic Curve algorithm | Mapping to HSM 1 |

A specific implementation example of the security manager function symmetricEncrypt is provided below in Tables 2-5 and a specific implementation example of the security manager function symmetricDecrypt is provided below in Tables 6-9.

symmetricEncrypt

This function encrypts data with a symmetric key.

TABLE 2 symmetricEncrypt Input:

| Parameter | Description | Mandatory/Optional | Header/Url/Body | Type |
|---|---|---|---|---|
| callerIdentifier | Identifier of the caller system | O | B | String |
| hsmKeyAlias | Alias of the key to use (if not provided a default one will be used) | O | B | String |
| dataToEncrypt | Data to encrypt (hex encoded) | M | B | String |

TABLE 3 symmetricEncrypt Output:

| Parameter | Description | Mandatory/Optional | Type |
|---|---|---|---|
| resultCode | The Result code of the task | M | String |
| errorManagement | Object identifying the error | O* | Object |
| errorCode | Code that identifies error occurred | M | String |
| errorDescription | Error description | M | String |
| encryptedData | The encrypted data | M | String |

*included if resultCode is FAILED

TABLE 4 symmetricEncrypt Results

| Result Code | Result Description |
|---|---|
| SUCCESS | Service executed successfully |
| FAILED | Service execution failed |

TABLE 5 symmetricEncrypt Example

| Protocol | REST |
|---|---|
| Path | [IP:PORT]/cxf/securityManager/symmetricEncrypt |
| Method | POST |
| Content type | application/json |

Example JSON request:
{
    "callerIdentifier": "bankA",
    "hsmKeyAlias":"aeskey",
    "dataToEncrypt": "33363231"
}
Example JSON response:
{
  "baseResponse": {
    "result": "SUCCESS"
  },
  "encryptedData":
  "C8BF4E043AFA5595D21F56E16DD15571"
} symmetricDecrypt

This function decrypts data with a symmetric key.

TABLE 6 symmetricDecrypt Input:

| Parameter | Description | Mandatory/Optional | Header/Url/Body | Type |
|---|---|---|---|---|
| callerIdentifier | Identifier of the caller system | O | B | String |
| hsmKeyAlias | Alias of the symmetric key to use (if not provided a default one will be used) | O | B | String |
| dataToDecrypt | Data to decrypt (hex encoded) | M | B | String |

TABLE 7 symmetricDecrypt Output:

| Parameter | Description | Mandatory/Optional | Type |
|---|---|---|---|
| resultCode | The Result code of the task | M | String |
| errorManagement | Object identifying the error | O* | Object |
| errorCode | Code that identifies error occurred | M | String |
| errorDescription | Error description | M | String |
| decryptedData | The decrypted data | M | String |

*included if resultCode is FAILED

TABLE 8 symmetricDecrypt Results

| Result Code | Result Description |
|---|---|
| SUCCESS | Service executed successfully |
| FAILED | Service execution failed |

TABLE 9 symmetricDecrypt Example

| | |
|---|---|
| Protocol | REST |
| Path | [IP:PORT]/cxf/securityManager/symmetricDecrypt |
| Method | POST |
| Content type | application/json |
| | Example JSON request:<br>{<br>　"callerIdentifier": "bankA",<br>　"hsmKeyAlias":"aeskey",<br>　"dataToDecrypt":<br>　　"C8BF4E043AFA5595D21F56E16DD15571"<br>}<br>Example JSON response:<br>{<br>　"baseResponse": {<br>　　"result": "SUCCESS"<br>　},<br>　"decryptedData": 33363231<br>} |

The function transformations 306 implement a mapping from the security manager functions and corresponding objects to HSM specific requested security functions 308 defined in the HSM chosen or configured to perform the security manager function in question.

Figure 4:
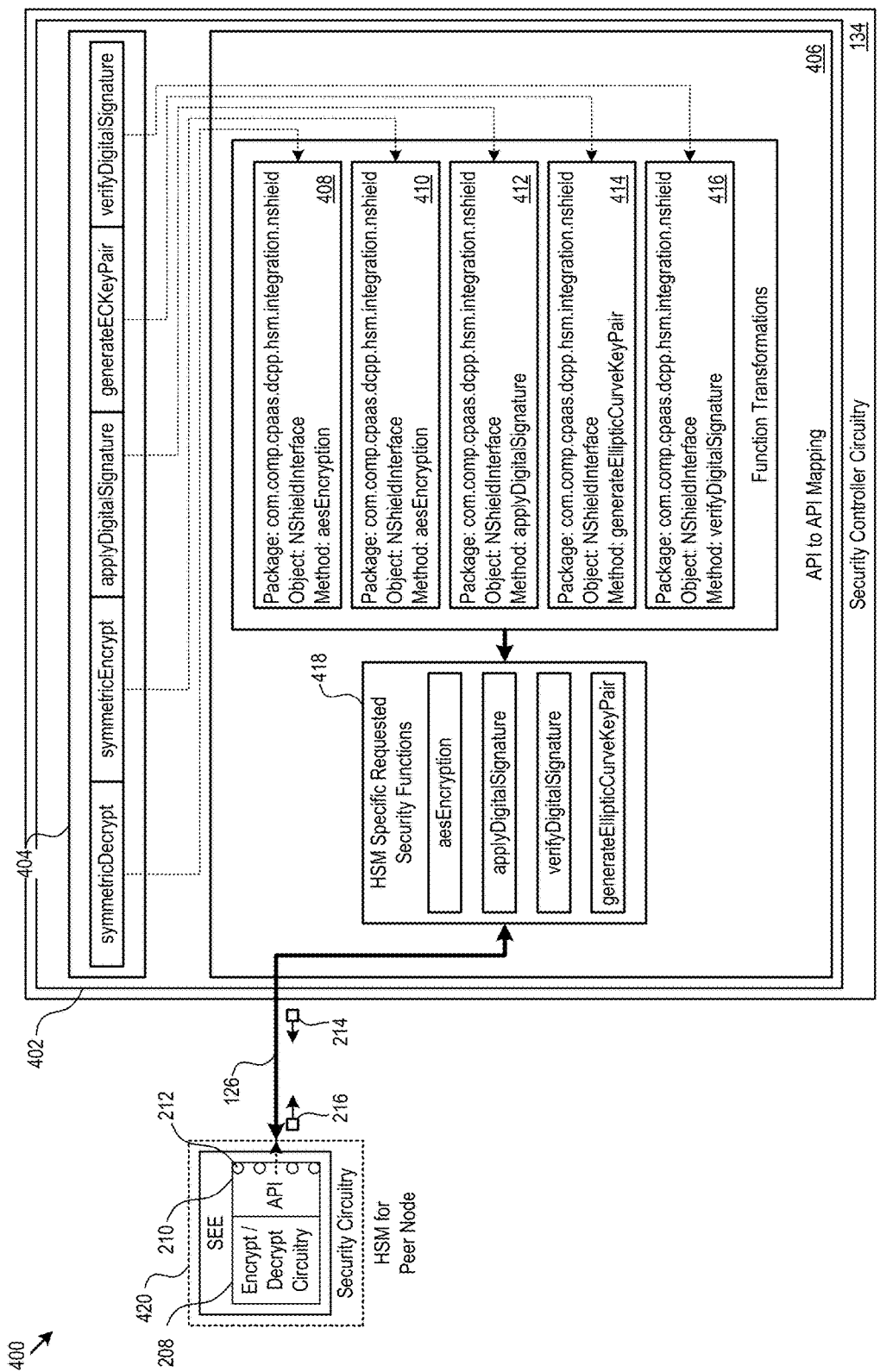
FIG. 4 shows another implementation example in which security manager circuitry exposes specific security manager functions as a security manager API.

FIG. 4 shows an implementation example 400 in which the HSM interface 402 defines a security circuitry API 404 that includes the five functions noted above. The HSM interface 402 further includes the API-to-API mapping 406. In this particular example, the API-to-API mapping 406 has implemented the symmetricDecrypt function transformation 408, the symmetricDecrypt function transformation 410, the applyDigitalSignature function transformation 412, the generateECKeyPair function transformation 414, and the verifyDigitalSignature function transformation 416. The function transformations 408-416 map each of the five functions available from security circuitry API 404 to HSM specific functions 418 defined for the particular HSM in use, in this case the HSM 420. Here, the API for the HSM 420 implements the functions called "aesEncryption" (used for both encryption and decryption), "applyDigitalSignature", "verifyDigitalSignature", and "generateEllipitcCurveKeyPair". As one specific example, an API call to the symmetricDecrypt function maps to the aesEncryption HSM API function. Table 10 summarizes the mapping from the security circuitry API 404 to the HSM 420 for this particular example.

TABLE 10

Mapping for HSM 420 symmetricEncrypt

| | |
|---|---|
| HSM specific function | Package: com.comp.cpaas.dcpp.hsm.integration.nshield<br>Object: NShieldInterface<br>Method: aesEncryption<br>symmetricDecrypt |
| HSM specific function | Package: com. comp.cpaas.dcpp.hsm.integration.nshield<br>Object: NShieldInterface<br>Method: aesEncryption<br>applyDigitalSignature |
| HSM specific function | Package: com. comp.cpaas.dcpp.hsm.integration.nshield<br>Object: NShieldInterface<br>Method: applyDigitalSignature<br>verifyDigitalSignature |

TABLE 10-continued

Mapping for HSM 420

| | |
|---|---|
| HSM specific function | Package: com. comp.cpaas.dcpp.hsm.integration.nshield<br>Object: NShieldInterface<br>Method: verifyDigitalSignature<br>generateECKeyPair |
| HSM specific function | Package: com. comp.cpaas.dcpp.hsm.integration.nshield<br>Object: NShieldInterface<br>Method: generateEllipticCurveKeyPair |

Figure 5:
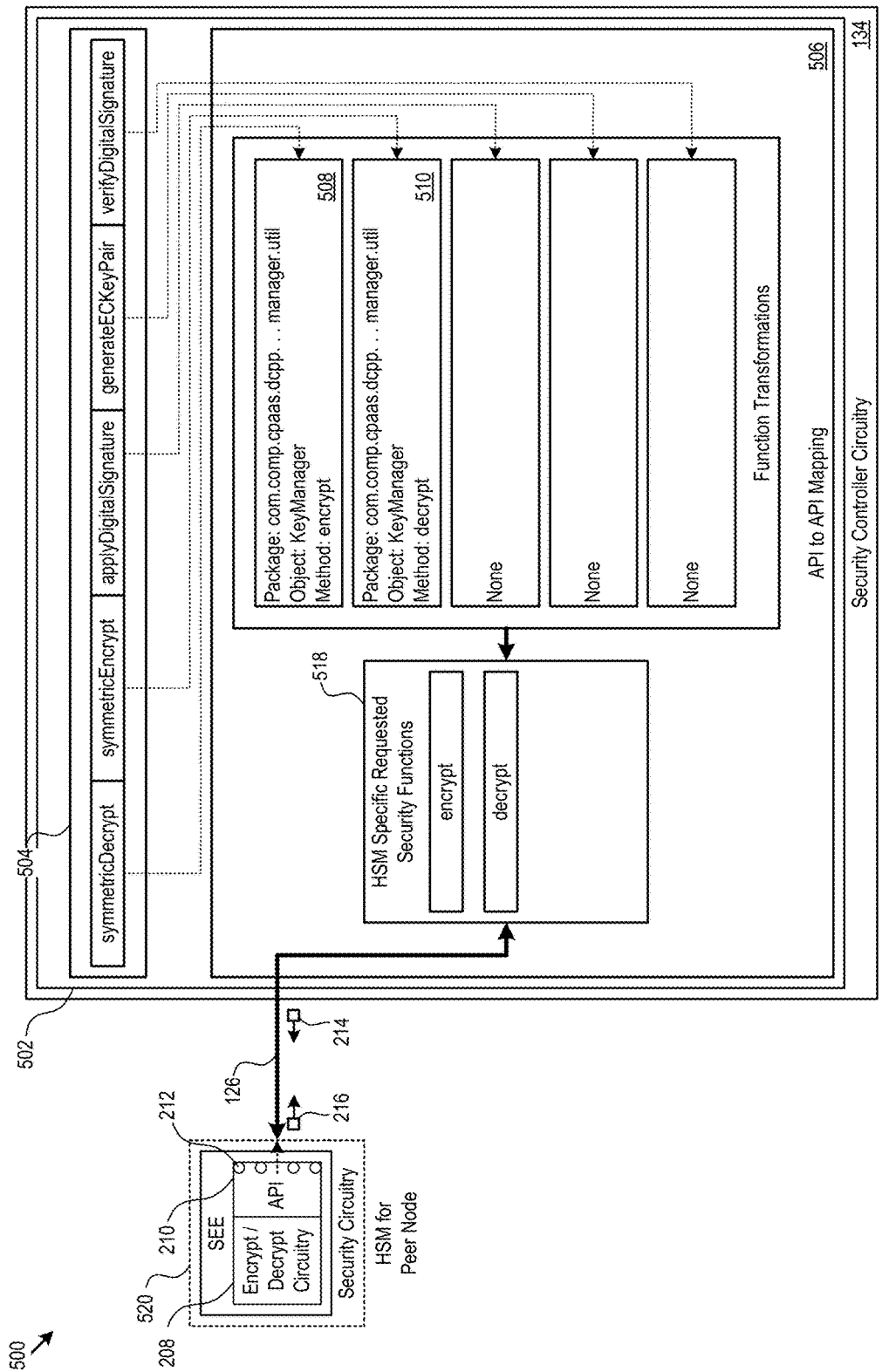
FIG. 5 illustrates an additional implementation example in which security manager circuitry exposes specific security manager functions.

FIG. 5 shows another implementation example 500 in which the HSM interface 502 defines a security circuitry API 504 that also includes the five functions noted above. The HSM interface 502 includes the API-to-API mapping 506. In this particular example, the API-to-API mapping 506 has implemented the symmetricDecrypt function transformation 508 and the symmetricDecrypt function transformation 510. Note that the API-to-API mapping 506 need not provide a mapping for every function, and in this case no mapping is defined for the applyDigitialSignature function, the generateECKeyPair function, or the verifyDigitalSignature function. Calls to those functions may be unsupported, may return an error code, may be handled by software in the peer node, may be passed to other systems, or may be handled in other manners.

The function transformations 508 and 510 map two of the five functions available from security circuitry API 504 to HSM specific functions 518 defined in the particular HSM in use, in this case the HSM 520. Here, the API for the HSM 520 implements the functions called "encrypt" for symmetric encryption and "decrypt" for symmetric decryption. As one specific example, an API call to the symmetricEncrypt function maps to the "encrypt" HSM API function. Table 11 summarizes the mapping from the security circuitry API 504 to the HSM 520 for this particular example.

TABLE 11

Mapping for HSM 520 symmetricEncrypt

| | |
|---|---|
| HSM specific function | Package:<br>com.comp.cpaas.dcpp.enabler.securitymanager.manager.util<br>Object: KeyManager<br>Method: encrypt<br>symmetricDecrypt |
| HSM specific function | Package:<br>com.comp.cpaas.dcpp.enabler.securitymanager.manager.util<br>Object: KeyManager<br>Method: decrypt<br>applyDigitalSignature |
| HSM specific function | None |
| | verifyDigitalSignature |
| HSM specific function | None |
| | generateECKeyPair |
| HSM specific function | None |

Figure 6:
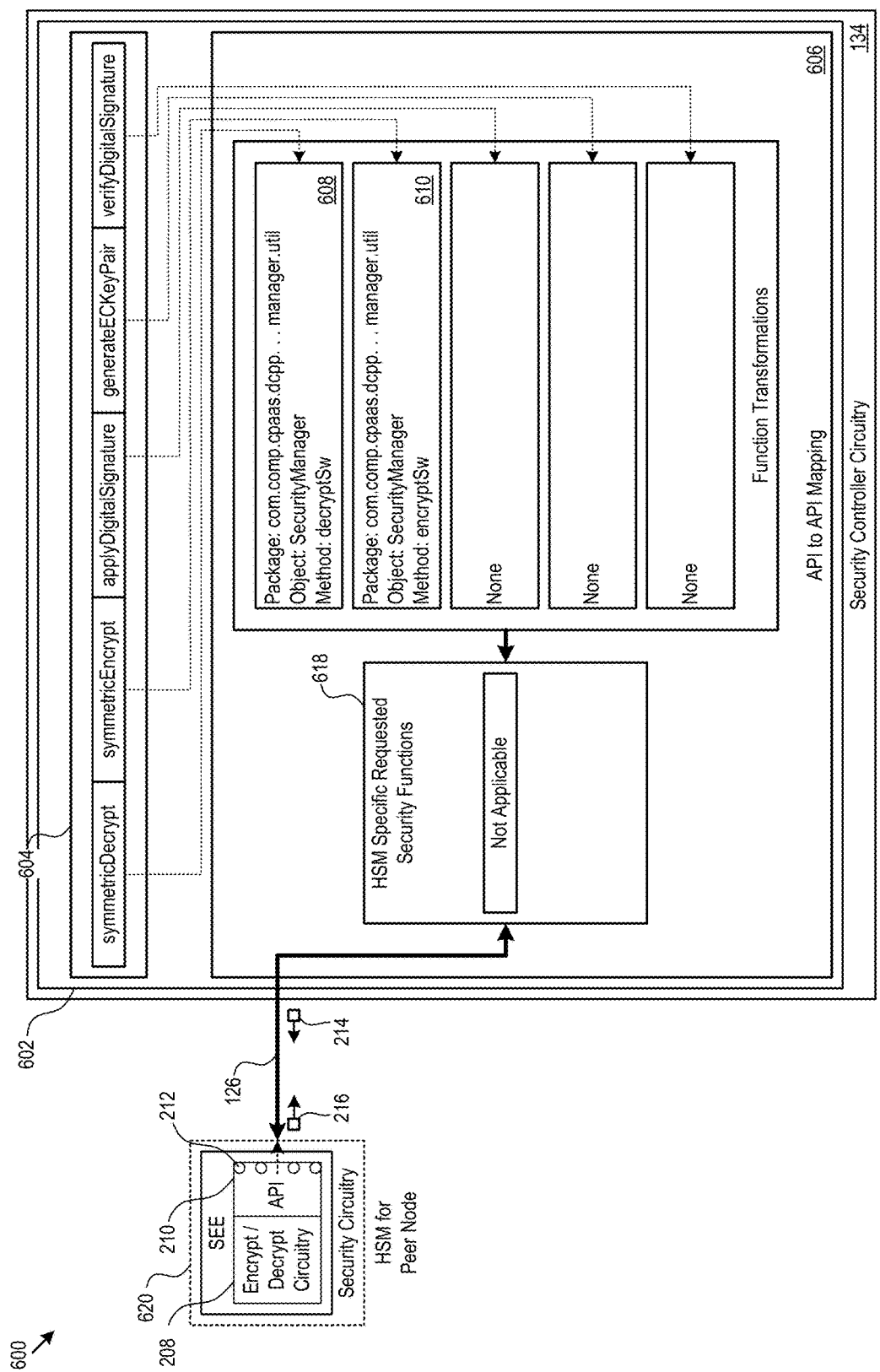
FIG. 6 illustrates an additional implementation example in which security manager circuitry exposes specific security manager functions.

FIG. 6 shows a third implementation example 600 in which the HSM interface 602 defines a security circuitry API 604. As before, the security circuitry API 604 includes the five functions noted above. The HSM interface 602 includes the API-to-API mapping 606. In this particular example, the API-to-API mapping 606 has implemented the symmetricDecrypt function transformation 608 and the symmetricDecrypt function transformation 610.

The function transformations 608 and 610 map two of the five functions available from security circuitry API 604 to software. That is, in this example, the peer node will rely on software implemented security functions, and an HSM is not called to provide hardware execution of the security functions. To that end, the function transformations 608 and 610 specify a software function to execute in response to API calls to the symmetricDecrypt function: the "decryptSw" function, and a software function to execute in response to API calls to the symmetricEncrypt function: the "encryptSw" function.

Table 12 summarizes the mapping from the security circuitry API 604 to the HSM 620 for this particular example.

TABLE 12

Mapping for HSM 620

| | symmetricEncrypt |
|---|---|
| HSM specific function | Package: com.accenture.cpaas.dcpp.enabler.securitymanager.manager.util Object: SecurityManager Method: encryptSw |
| | symmetricDecrypt |
| HSM specific function | Package: com.accenture.cpaas.dcpp.enabler.securitymanager.manager.util Object: SecurityManager Method: decryptSw |
| | applyDigitalSignature |
| HSM specific function | None |
| | verifyDigitalSignature |
| HSM specific function | None |
| | generateECKeyPair |
| HSM specific function | None |

Figure 7:
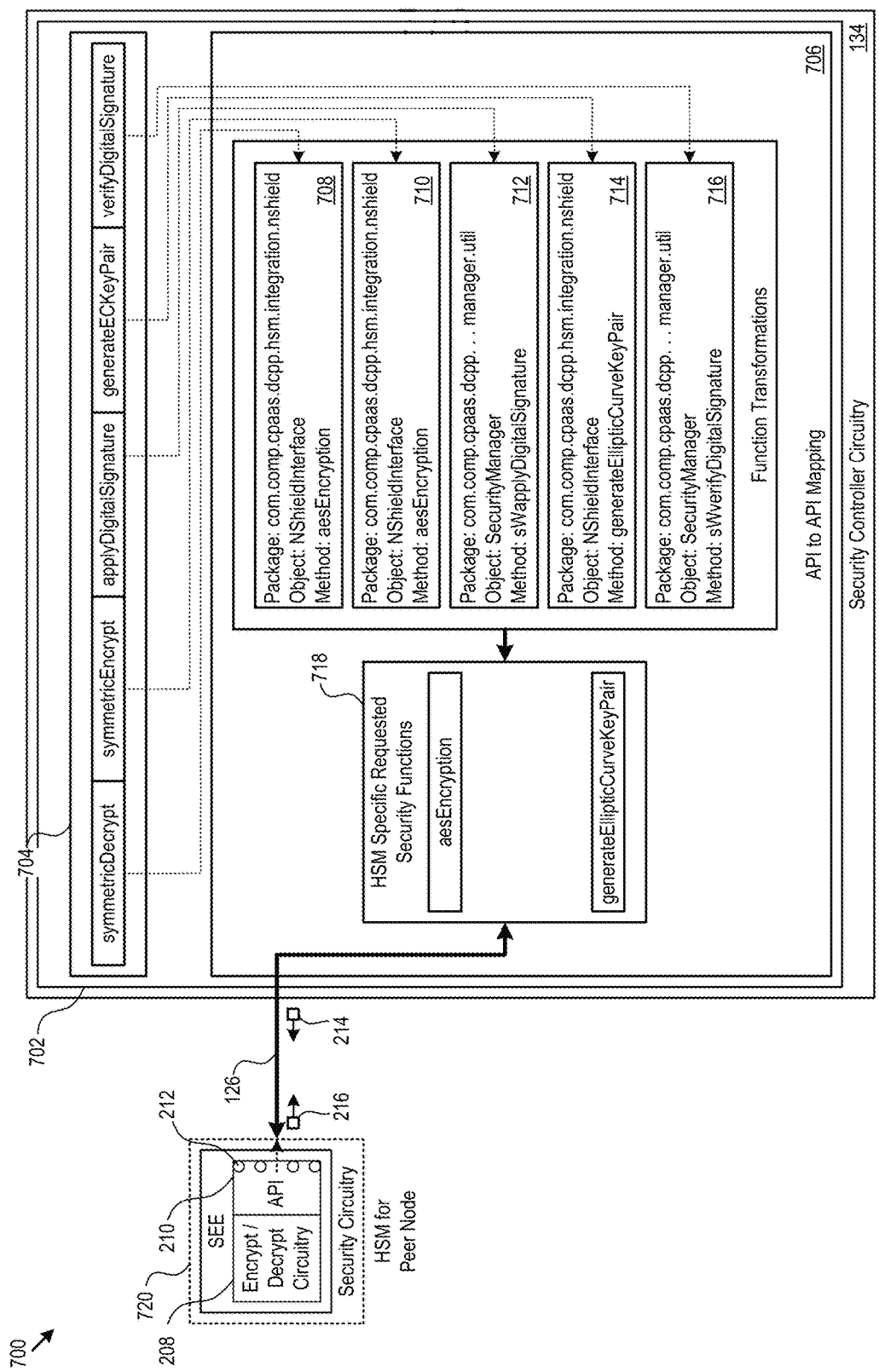
FIG. 7 shows a hybrid implementation example of the HSM interface implementing a security circuitry API.

FIG. 7 shows a hybrid implementation example 700 of the HSM interface 702 implementing a security circuitry API 704. In this particular example, the API-to-API mapping 706 has implemented the symmetricDecrypt function transformation 708, the symmetricDecrypt function transformation 710, the applyDigitialSignature function transformation 712, the generateECKeyPair function transformation 714, and the verifyDigitalSignature function transformation 716. However, in this example, the API-to-API mapping 706 uses a mix of HSM and software functions to carry out the calls to the security circuitry API 704.

The function transformations 708, 710, and 714 map three of the five functions available from security circuitry API 704 to HSM specific functions 718 for the HSM 720. More specifically, the calls to symmetricDecrypt, symmetricEncrypt, and generateECKeyPair are mapped to their counterpart functions in the HSM 720. On the other hand, the function transformations 712 and 716 handle calls to apply or verify a digital signature by mapping the calls to software functions: sWapplyDigitalSignature and sWverifyDigital-Signature, respectively. Table 13 summarizes the mapping from the security circuitry API 704 to the HSM 720 for this particular example.

TABLE 13

Mapping for HSM 720

| | symmetricEncrypt |
|---|---|
| HSM specific function | Package: com.comp.cpaas.dcpp.hsm.integration.nshield Object: NShieldInterface Method: aesEncryption |
| | symmetricDecrypt |
| HSM specific function | Package: com. comp.cpaas.dcpp.hsm.integration.nshield Object: NShieldInterface Method: aesEncryption |
| | applyDigitalSignature |
| HSM specific function | Package: com.accenture.cpaas.dcpp.enabler.securitymanager.manager.util Object: SecurityManager Method: sWapplyDigitalSignature |
| | verifyDigitalSignature |
| HSM specific function | Package: com.accenture.cpaas.dcpp.enabler.securitymanager.manager.util Object: SecurityManager Method: sWverifyDigitalSignature |
| | generateECKeyPair |
| HSM specific function | Package: com. comp.cpaas.dcpp.hsm.integration.nshield Object: NShieldInterface Method: generateEllipticCurveKeyPair |

Figure 8:
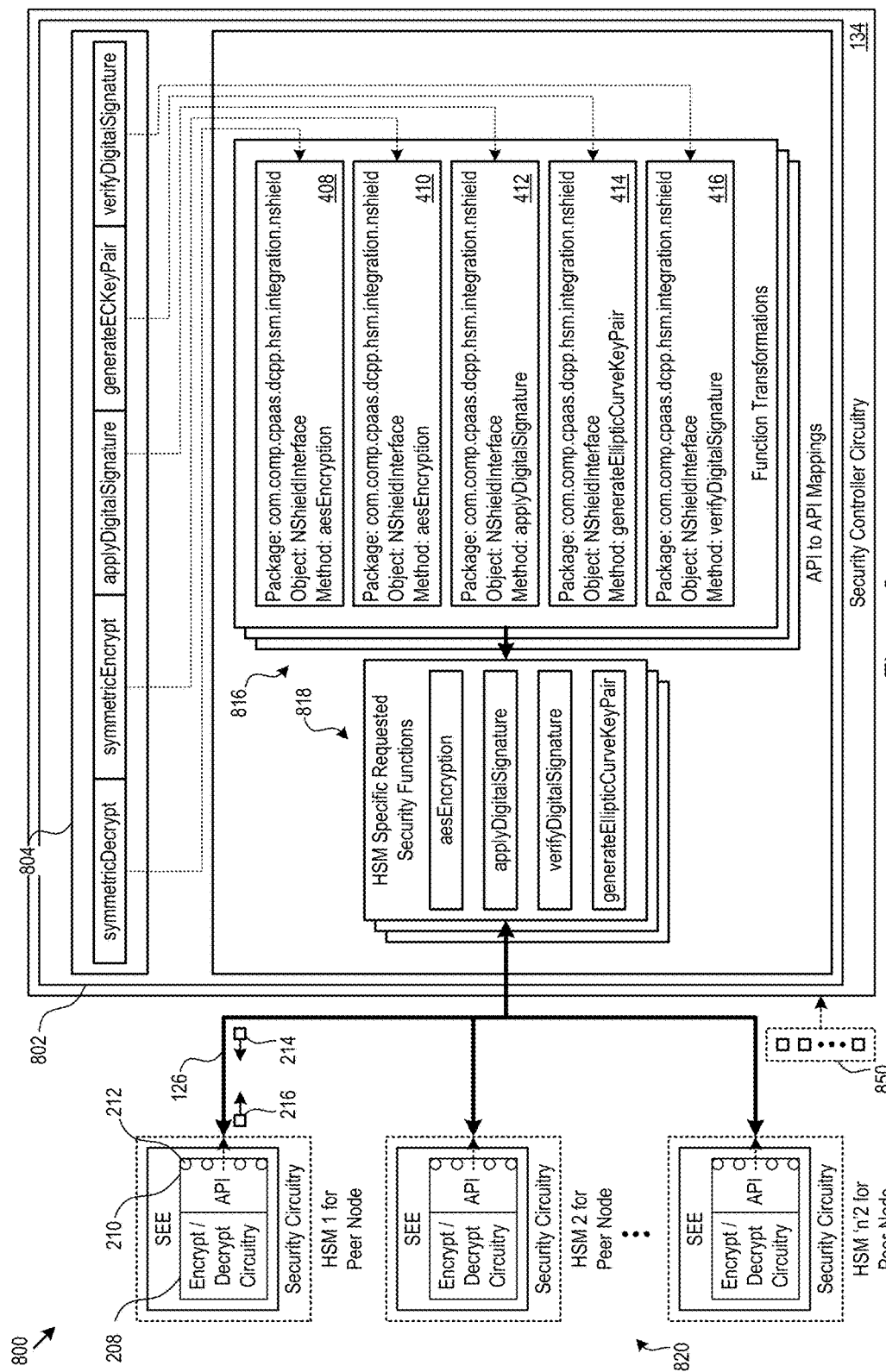
FIG. 8 shows an implementation example of the HSM interface 802 supporting multiple HSMs.

FIG. 8 shows another implementation example 800 of the HSM interface 802 including the security circuitry API 804. In this example, the HSM interface 802 supports multiple HSMs 820 for a single peer node, e.g., the HSMs 1 through HSM 'n'. The HSMs may be the same or different HSMs, and may be provided for redundancy, load balancing, fault tolerance, or for other reasons. In support of the multiple HSMs 820, the HSM interface 802 defines multiple API-to-API mappings 806, one for each unique HSM. Then, as the HSM interface 802 switches between different HSMs, the HSM interface 802 performs mappings according to the HSM in use at the time. In some implementations, configuration files 850 specify the API-to-API mappings for any pre-determined HSMs. The security controller circuitry may load one or more corresponding configuration files to define the API-to-API mappings to quickly and efficiently establish the mapping to whichever HSM the security controller circuitry will have assist with security functions.

Figure 9:
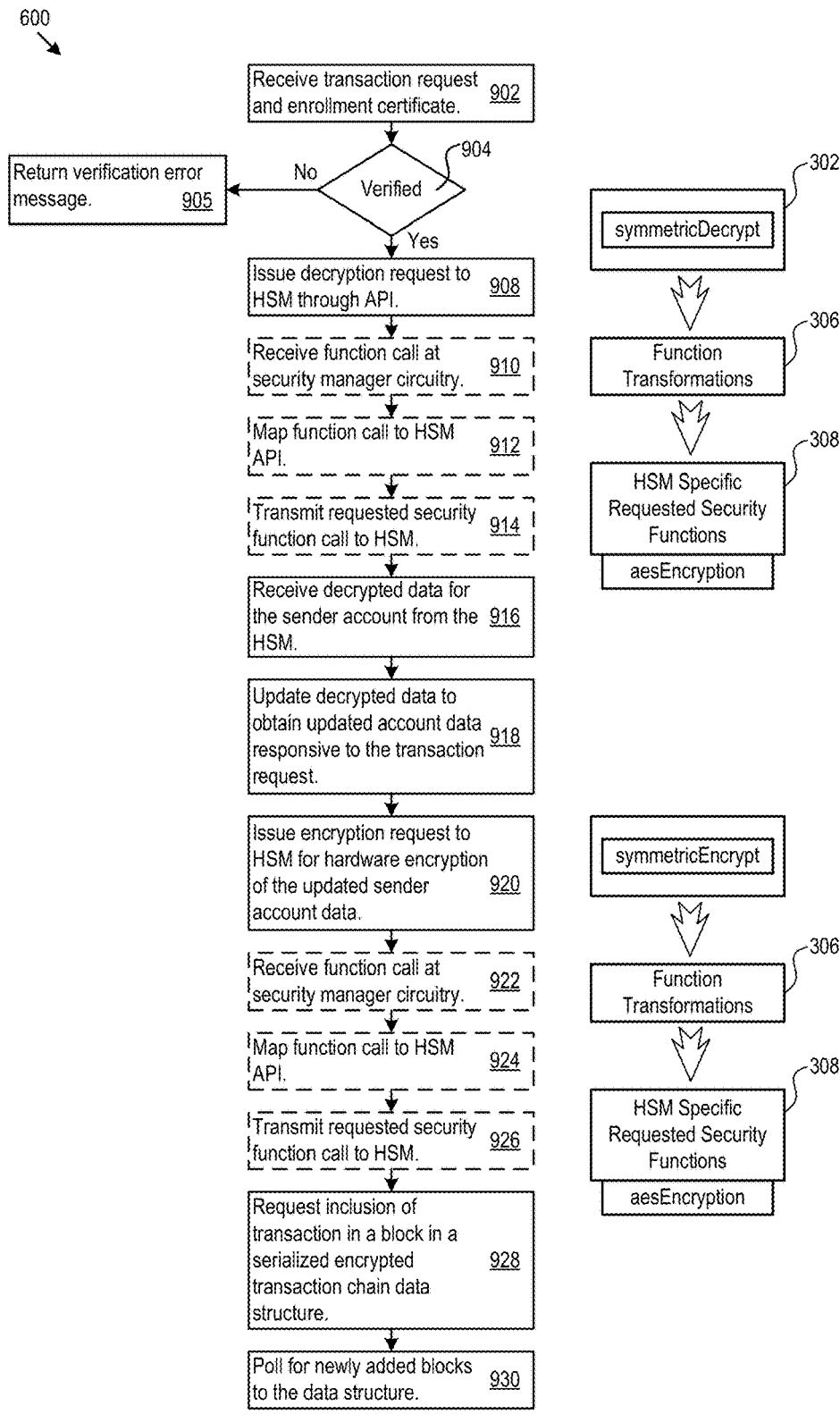
FIG. 9 shows logic that a hardware accelerated transaction processing system may implement.

FIG. 9 shows logic 900 that a hardware accelerated transaction processing system may implement. A hardware transaction processing system receives, at an authentication interface, a transaction request and an enrollment certificate (902). The system verifies a sender account linked to the transaction request (904) and may return a verification error message if verification fails (906).

The system issues a decryption request to a hardware security module for hardware decryption of the sender account (908). To that end, security manager circuitry may receive a decryption request function call (910), map the function call to the HSM API (912), and transmit the HSM specific function call to the HSM (914). The security manager circuitry receives decrypted data for the sender account from the hardware security module (916), e.g., as a return value from the HSM specific API function call.

The security manager circuitry may then perform a data update on the decrypted data. For instance, the security manager circuitry may generate updated account data responsive to the transaction request, e.g., by debiting or crediting an account (918). Once updated, the system issues an encryption request to the hardware security module for hardware encryption of the updated sender account data (920). The encryption request may pass to the HSM through an API function call, for instance. As with decryption, the API may implement a pre-determined mapping to a method implemented by one or more different HSMs for encryption. That is, the security manager circuitry receives an encryption request function call (922), translates the function call to the HSM API (924), and transmits the HSM specific function call to the HSM (926).

The system then adds the updated account data to a serialized encrypted transaction chain data structure. For instance, the system may issue a request for inclusion of the encrypted updated account data that reflects the transaction request in a block in the serialized encrypted transaction chain data structure (928). In one implementation, after consensus is reached (e.g., all nodes have the same copy of the data structure), the new transaction is handed out to all other bank nodes and is formally injected into the blockchain. The system may implement, for instance, the Practical Byzantine Fault Tolerance (PBFT) algorithm to provide increased speed and scalability to reach consensus in a private, permission blockchain system. After consensus has been reached and the transaction is included in the blockchain, a polling mechanism at the system and other like systems consistently checks for new blocks that have been added to the data structure (930).

The methods, devices, architectures, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. For instance, any of the components and functionality in the architecture may be hosted in virtual machines managed by a cloud services provider. That is, while some implementations may be completely localized within a given enterprise, other implementations are completely migrated into the cloud, or are hybrid implementations with mixed local and cloud implementation. Regarding querying devices, the smartphones applications and desktop computers noted above are just particular examples, and other querying devices may be used, including hands-free systems in vehicles, digital personal assistants in smartphones or desktop PCs, hands-free control systems for the home, and many other types of devices.

What is claimed is:

1. A method comprising:
in a hardware security system:
establishing a communication connection with a hardware security module (HSM) of each of a plurality of respective nodes;
responsively invoking security controller circuitry to process chaincodes supporting implementation of a data storage layer for each of the respective nodes, the security controller circuitry comprising:
an HSM interface that includes:
a security circuitry application programming interface (API); and
an API-to-API mapping;
receiving, at the security controller circuitry, a security function call made to the security circuitry API of each of the respective nodes;
calling the chaincodes to update respective nodes identified with the security function call, the identified respective nodes comprising a sender node and a receiver node;
mapping the security function call to an HSM specific function call for a respective HSM of each of the sender node and the receiver node, the mapping performed via the API-to-API mapping;
transmitting the HSM specific function call to the respective HSM of each of the sender node and the receiver node; and
receiving a security response from the respective HSM of each of the sender node and the receiver node, the security response received over the communication connection, and the security response received in response to the HSM specific function call.

2. The method of claim 1, further comprising:
exposing, with the security function call, a respective security function in the security circuitry API of the sender node and the receiver node.

3. The method of claim 1, further comprising:
exposing, with multiple security function calls, multiple respective security functions in the security circuitry API of the sender node and the receiver node;
the multiple respective security functions within a predetermined set of security functions for each of the sender node and the receiver node; and
the multiple security function calls including:
a data encryption function call; and
a data decryption function call.

4. The method of claim 1, further comprising:
exposing, with multiple security function calls, multiple respective security functions in the security circuitry API for each of the sender node and the receiver node;
the multiple respective security functions within a predetermined set of security functions; and
the multiple security function calls including:
a signature application function call; and
a signature verification function call.

5. The method of claim 1, further comprising:
exposing, with multiple security function calls, multiple respective security functions in the security circuitry API for each of the sender node and the receiver node;
the multiple respective security functions within a predetermined set of security functions; and
the multiple security function calls including:
a key pair generation function call.

6. The method of claim 1, where:
the API-to-API mapping implements a redirection of the security function call to the HSM specific function call for the respective HSM of each of the sender node and the receiver node.

7. The method of claim 1, where:
the API-to-API mapping implements redirection of the security function call to the HSM specific function call for the respective HSM of each of the sender node and the receiver node; and
the API-to-API mapping also implements redirection of a different security function call to a software process.

8. The method of claim 1, where:
the respective HSM is one of multiple different HSMs of each of the sender node and the receiver node, the multiple different HSMs in communication with the security controller circuitry of the respective sender node and the receiver node; and
the HSM interface is one of multiple HSM interfaces assigned to the different HSMs.

9. The method 1, further comprising:
loading a configuration file that defines the API-to-API mapping for the respective HSM of each of the sender node and the receiver node.

10. The method of claim 1, wherein transmitting the HSM specific function call comprises requesting the sender node and the receiver node to each independently execute predetermined security functions based on the HSM specific function call.

11. A security system comprising:
a communication interface configured to connect to a hardware security module (HSM) of each of a plurality of respective nodes;
an HSM interface of each of the respective nodes, the HSM interface comprising:
a security circuitry programming interface (API); and
an API-to-API mapping; and
security controller circuitry configured to:
receive, at the security controller circuitry, a security function call made to the security circuitry API of each of the respective nodes;
dynamically invoke chaincodes to update respective nodes identified with the security function call, the chaincodes supporting implementation of a data storage layer, and the identified respective nodes comprising a sender node and a receiver node;
map the security function call to an HSM specific function call for the HSM of each of the sender node and the receiver node, the mapping performed via the API-to-API mapping;
transmit the HSM specific function call to the HSM of each of the sender node and the receiver node; and
receive a security response from the HSM of each of the sender node and the receiver node, the security response received over the communication interface, and the security response received in response to the HSM specific function call.

12. The system of claim 11, where:
the security circuitry API of the sender node and the receiver node is configured to expose the security function call to each of the sender node and the receiver node.

13. The system of claim 11, where:
the security function call comprises multiple security function calls received at the security circuitry API of the sender node and the receiver node, the multiple security function calls corresponding to security functions within a predetermined set of security functions, the multiple security function calls including:
a data encryption function call; and
a data decryption function call.

14. The system of claim 11, where:
the security function call comprises multiple security function calls received at the security circuitry API of the sender node and the receiver node, the multiple security function calls corresponding to security functions within a predetermined set of security functions, the multiple security function calls including:
a signature application function call; and
a signature verification function call.

15. The system of claim 11, where:
the security function call comprises multiple security function calls received at the security circuitry API of the sender node and the receiver node, the multiple security function calls corresponding to security functions within a predetermined set of security functions, the multiple security function calls including:
a key pair generation function call.

16. The system of claim 11, where:
the API-to-API mapping comprises a redirection of the security function call to the HSM specific function call of the HSM of each of the sender node and the receiver node.

17. The system of claim 11, where:
the API-to-API mapping comprises:
a redirection of the security function call to the HSM specific function call of the HSM of each of the sender node and the receiver node; and
a redirection of a different security function call to a software process.

18. The system of claim 11, where:
the HSM interface of each of the sender node and the receiver node is one of multiple HSM interfaces assigned to different HSMs of each of the sender node and the receiver node.

19. The system 11, where:
the security controller circuitry is further configured to load a configuration file that defines the API-to-API mapping for the HSM of each of the sender node and the receiver node.

20. A security system comprising:
a hardware support interface to a hardware security module (HSM) of each of a plurality of respective nodes, the hardware support interface defining an HSM application programming interface (API) that exposes HSM functions;
a security controller interface configured to receive a security request function call directed to each of the respective nodes; and
security controller circuitry in communication with the security controller interface and the hardware support interface of each of the respective nodes, the security controller circuitry of each of the respective nodes responsively invoked to process chaincodes supporting implementation of a data storage layer, and comprising an HSM function interface including:
 a security circuitry API that exposes security circuitry functions; and
 an API-to-API mapping between the security circuitry functions and the HSM functions;
the security controller circuitry configured to:
 receive, at the security controller interface, a security function call made via the security circuitry API in response to the security request function call;
 call the chaincodes to update respective nodes identified with the security function call, the identified respective nodes comprising at least one of a sender node or a receiver node;
 translate, via the API-to-API mapping, the security function call to an HSM specific function call for the HSM of each of the respective nodes identified with the security function call;
 transmit the HSM specific function call to the HSM of each of the respective nodes identified with the security function call; and
 receive a security response from the HSM of each of the respective nodes over the hardware support interface in response to the HSM specific function call.

21. The system of claim 20, where:
the security circuitry functions include an encryption request function and a decryption request function;
the API-to-API mapping is configured to redirect the encryption request function to an HSM specific hardware implemented encryption function of the HSM of each of the respective nodes identified with the security function call; and
the API-to-API mapping is configured to redirect the encryption request function to an HSM specific hardware implemented decryption function of the HSM of each of the respective nodes identified with the security function call.

* * * * *